INVENTOR
J. H. BEARD

United States Patent Office 3,303,686
Patented Feb. 14, 1967

3,303,686
MANIPULATORS
Jack Herbert Beard, Sheffield, England, assignor to Davy and United Engineering Company Limited, Sheffield, England
Filed Nov. 25, 1964, Ser. No. 413,862
9 Claims. (Cl. 72—420)

This invention relates to manipulators, and is cognate with our application No. 3,114/64.

In a known type of forging manipulator the rear end of the peel is rotatably and pivotally carried on a drivable manipulator carriage, the forward end of the peel is supported by a single endless driving chain passing round a sprocket keyed to the peel and a further sprocket slidably supported on slide bars mounted on the manipulator carriage. The peel can be rotated by driving the further sprocket and thus the chain in either direction, and the forward end of the peel can be raised or lowered by sliding the further sprocket along the slide bars away from or towards the forward end of the carriage. Such a manipulator is described in United States patent specification No. 2,864,271.

We have found that in the larger sizes of manipulator this arrangement imposes too great a strain on the chain which is used to both carry and rotate the peel. Accordingly, we provide separate means for carrying the main weight of the forward end of the peel and for rotating the peel.

In one aspect the invention provides a manipulator comprising a carriage carrying a peel, a support structure mounted on the carriage, a peel end supporting device, in the form of a chain, belt or the like, connecting the forward end of the peel and the support structure to support the main weight of the forward end of the peel, a driving chain passing round a sprocket secured to the peel, means for driving the driving chain in either direction to rotate the peel, and means for maintaining tension in the driving chain irrespective of the position of the forward end of the peel.

In a preferred from the invention provides a manipulator comprising a carriage carrying a peel, a support structure mounted on the carriage for forwards and rearwards movement relative to the carriage, a peel end supporting device, in the form of a chain, belt or the like, connecting the forward end of the peel and the support structure to support the main weight of the forward end of the peel, means for moving the support structure forwards and rearwards to lower or lift said forward end, an endless driving chain passing round a sprocket keyed to the peel and a driving sprocket slidably mounted on the carriage, means for driving the driving sprocket in either direction to rotate the peel, and means for maintaining tension in the driving chain irrespective of the position of the forward end of the peel.

These embodiments of manipulator in accordance with the invention will now be described, by way of example only, with reference to the accompanying drawings of which:

Figure 1:
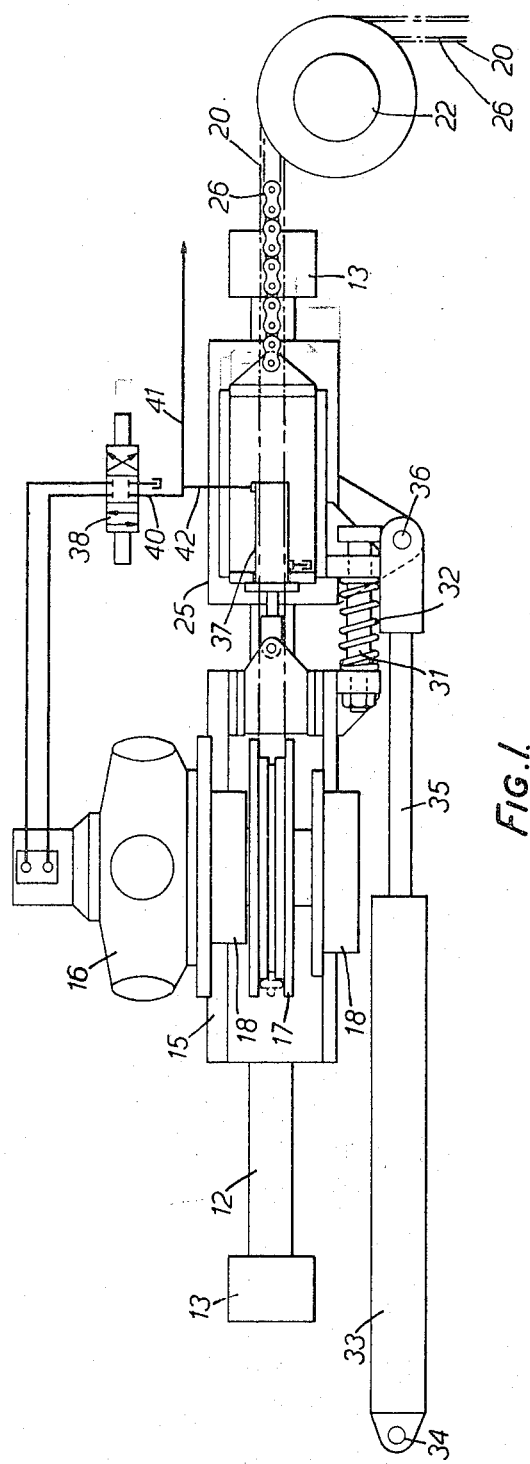
FIGURE 1 is a side view of apparatus for supporting and rotating the forward end of the peel of the manipulator and FIGURE 2 is a plan view of the apparatus of FIGURE 1 with the hydraulic motor removed.
Figure 2:
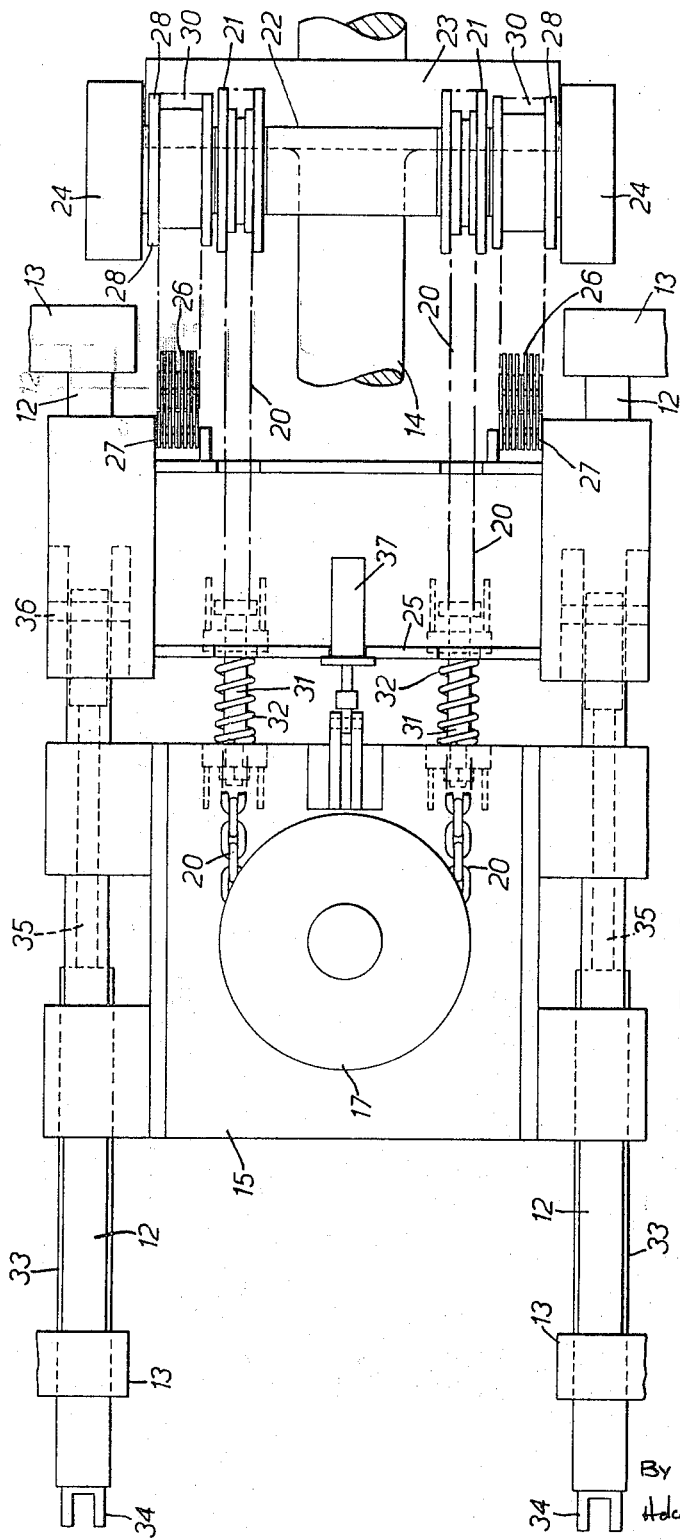
Figure 3:
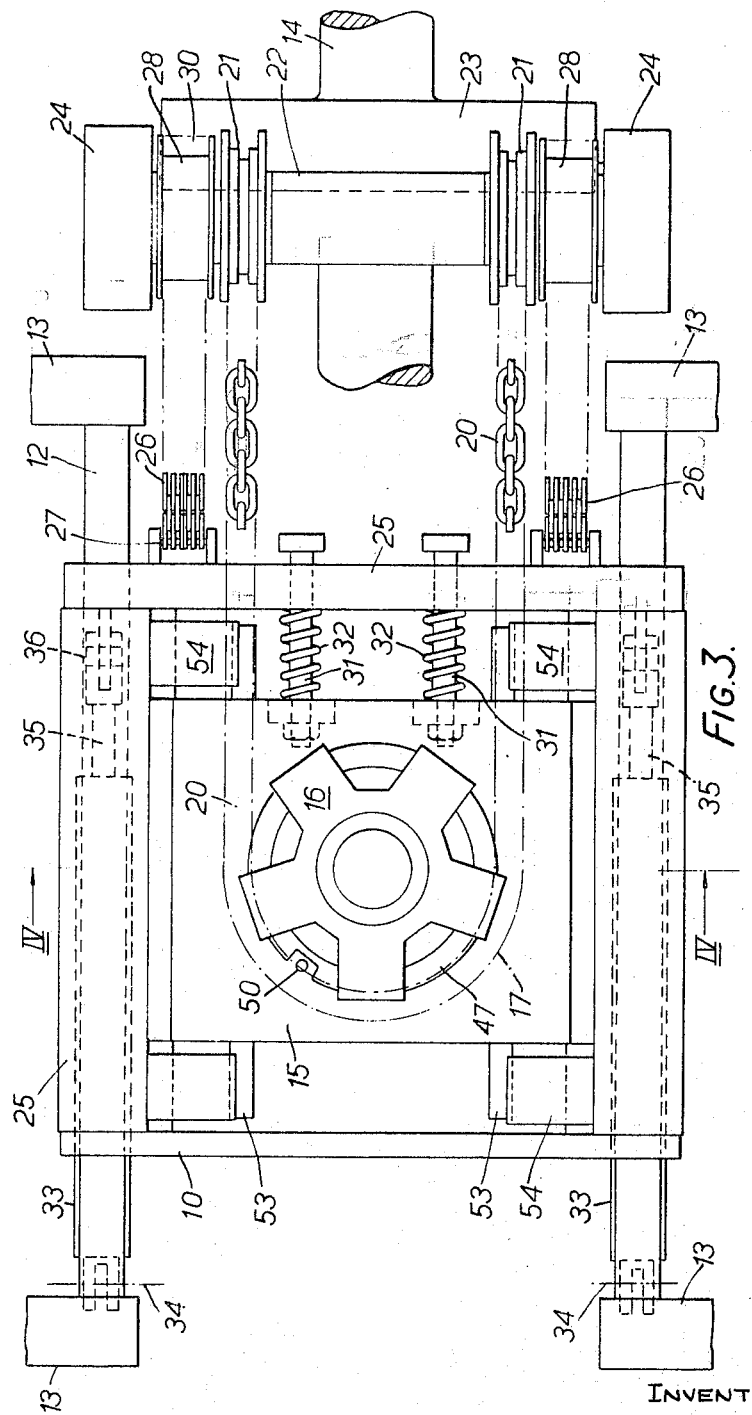
FIGURE 3 is a plan view of alternative apparatus for supporting and rotating the forward end of the peel of a manipulator.
Figure 4:
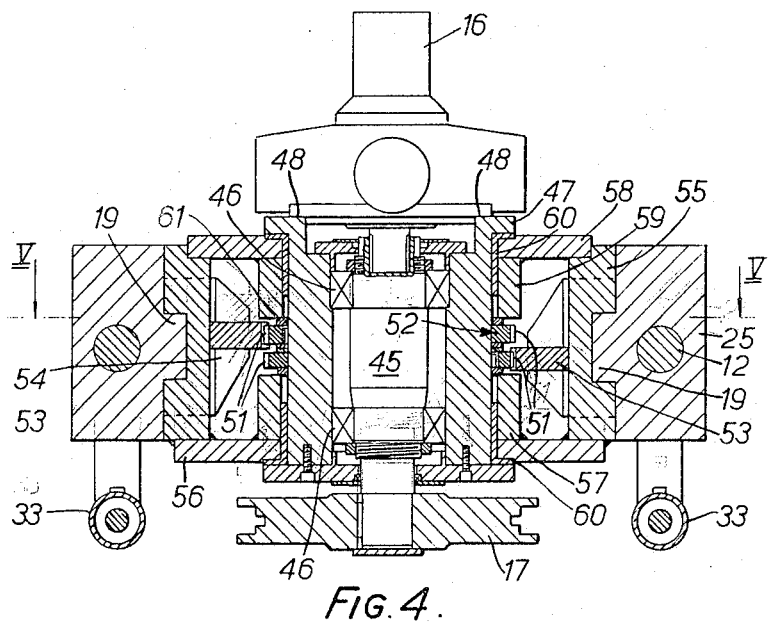
FIGURE 4 is a section on the line IV—IV of FIGURE 3.
Figure 5:
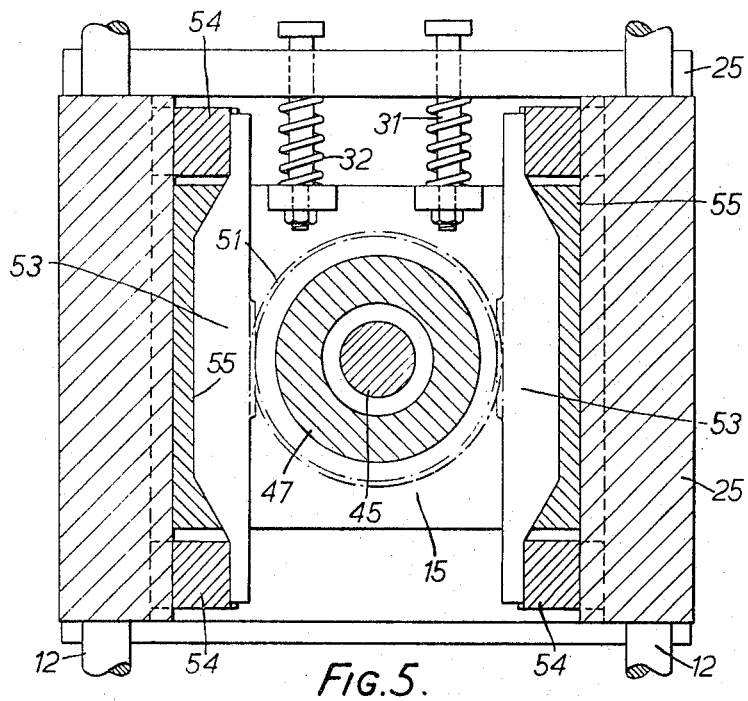
FIGURE 5 is a section on the line V—V of FIGURE 4.

Referring to FIGURES 1 and 2 a pair of slide bars 12 are rigidly mounted on supports 13 on a manipulator carriage (not shown) above the peel 14. Mounted on the slide bars is a drive unit mounting 15, the drive unit comprising a hydraulic motor 16 arranged to drive in either direction a driving sprocket 17 mounted for rotation about a vertical axis in bearing housings 18.

A horizontally extending loop of an endless driving chain 20 passes round the sprocket 17, the reaches of the chain then passing over idler pulleys 21 on a shaft 22 and the substantially vertically extending loop extending from the pulleys 21 passes round a driven sprocket not shown, in a sprocket box 23 secured to the forward end of the peel 14. A ball and sprocket interconnection, not shown, is provided between the peel and the driven sprocket, whereby the peel may have a varying angular relation with the plane of the sprocket. The shaft 22 is rigidly supported on the manipulator carriage by supports 24.

The rear end, not shown, of the peel 14 is supported for rotation about its longitudinal axis, for pivotal movement about a horizontal axis, and for limited axial movement of the peel, for example as described in the United States Patent No. 2,864,271.

A support structure in the form of a crosshead 25 is also mounted for sliding movement on the slide bars 12. Supporting cable chains 26 are anchored to the crosshead at 27, pass over plain idler pulleys 28 on the shaft 22 and are secured to the sprocket box 23 at 30. These chains serve to support the main weight of the forward end of the peel 14, and may be replaced by cable, link belt or the like. The crosshead 25 is connected to the peel drive unit mounting 15 by a pair of bolts 31. A spring 32 is mounted coaxially around each bolt to urge the peel drive unit rearwards relative to the crosshead with at least sufficient force to overcome the weight of the hanging peel drive chain 20 and the friction between the peel drive unit mounting 15 and the slide bars 12.

A peel tilt cylinder 33 is secured to a crank plate anchorage at 34 on the manipulator carriage and has a piston 35 pivotally secured at 36 to the lower part of the crosshead 25. The piston and cylinder 35, 33 extends horizontally to provide horizontal sliding movement of the crosshead 25. A single acting cylinder and piston assembly 37 is mounted on the crosshead and connected to the peel drive unit mounting so as to urge the peel drive unit rearwards when the piston is subject to pressure. A directional control value 38 for the peel motor 16, mounted on the peel drive unit, has its inlet connection 40, for connection to a pump on the line 41, further connected by line 42 to the inlet of the hydraulic piston and cylinder assembly 37. The size of this piston is such that the load it imparts under any given system pressure on the pump line, is at least equal to the tension in the peel rotating chain 20 due to the same pressure being applied to the peel rotating motor 16.

Thus, at all times, there is a greater total force urging the peel drive unit rearwards than the tension on the peel drive chain tending to pull the peel drive unit forwards, this ensures that the driving chain will be kept in mesh with the driving and driven sprockets under all conditions of stretch and wear, and when the piston 35 is operated to move the crosshead 25 rearwardly to raise the forward end of the peel. The rearward force produced by the piston and cylinder assembly 37 is, however, related to the forward force produced by the tension of the chain, and the difference between the two can never be sufficiently large as to cause the peel to be hoisted by the peel rotating chain.

FIGURES 3 to 7 show a modified form of manipulator in which parts similar to those in FIGURES 1 and 2 have been given the reference numerals, and will not be redescribed.

In this embodiment the peel drive unit mounting 15 is slidably carried on slideways 19 of the supporting crosshead 25. The crosshead 25 is mounted for horizontal sliding movement parallel to the axis of the carriage on the slide bars 12. As before the chains 26 serve to support the main weight of the forward end of the peel 14. The front plate of the crosshead 25 is connected to the peel drive unit mounting 15 by a pair of bolts 31. A spring 32 is mounted coaxially around each bolt to urge the peel drive unit mounting rearwards relative to the crosshead with at least sufficient force to overcome the weight of the hanging peel drive chain 20 and the friction between the peel drive unit support 15 and the slideways 19.

A peel tilt cylinder 33 is secured to a crank plate anchorage at 34 on the manipulator carriage and has a piston 35 secured at 36 to the lower part of the crosshead 25. The piston and cylinder 35, 33 extends horizontally to provide horizontal sliding movement of the crosshead 25 on the slide bars 12.

The peel rotating hydraulic motor 16 transmits its torque to the driving sprocket 17 via a shaft 45 supported by spherical roller bearings 46 located in a rotatable sleeve 47 to which the peel rotating motor 16 is affixed at 48. By this arrangement the torque transmitted to the driving sprocket 17 is also transmitted to the rotatable sleeve 47 with the same magnitude but in the reverse direction. The rotation of the sleeve is limited by a pin 50.

Two pinions 51 are mounted on the outside of the sleeve 47 with uni-directional clutches 52 interposed between the pinions and the sleeve. Each of the pinions meshes with a separate rack 53 rigidly mounted by brackets 54 on the crosshead 25. The drive unit support 15 comprises beams 55 slidable on the slideways 19, a lower plate 56 welded to the base of these beams and carrying a lower boss 57, and an upper removable plate 58 carrying a top boss 59. Phosphor bronze bushes 60 are located between the plates and bosses and the sleeve, and Phosphor bronze bearing pads and retainers 61 are located between the bosses and the clutches.

Each of the uni-directional clutches 52 permits drive transmission in a direction opposed to that of the other and are so arranged that the torque transmitted to the rotatable sleeve always urges the peel drive unit rearwards by virtue of the force exerted between the relevant rack and pinion, irrespective of the direction of rotation of the peel drive motor.

The pitch circle diameter of each pinion 51 is the same as or slightly smaller than the pitch circle diameter of the peel driving sprocket 17, with the result that the torque transmitted via the peel rotating motor casing urges the peel drive unit rearwards with the same or slightly greater force than that force in the chain imposed by the torque on the driving sprocket tending to urge the peel drive unit forwards.

Figure 6:
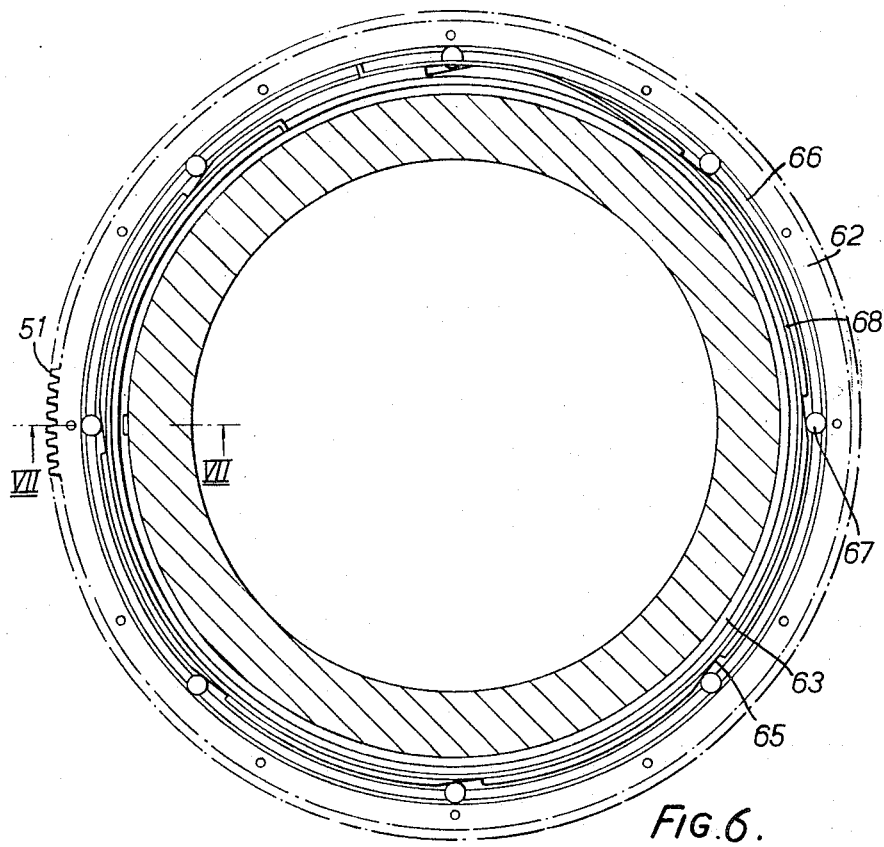
FIGURE 6 is a diametrical section through a clutch forming part of the apparatus.
Figure 7:
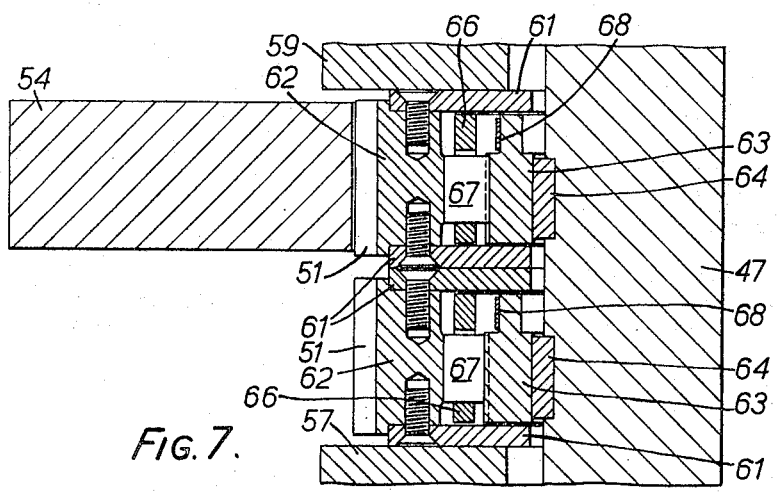
FIGURE 7 is an enlarged sectional view on the line VII—VII of FIGURE 6.

FIGURES 6 and 7 show enlarged detailed section through the gears and uni-directional clutches. Each clutch consists of an outer ring 62 to which the pinions 51 are keyed or as part of which the pinions are integrally machined; and an inner ring 63 keyed by a key 64 to the sleeve 47. The inner ring 63 has a series of inclined surfaces 65 machined equidistantly in its outer periphery. Interposed between the inner and outer ring is a cage 66 whose purpose is to separate hardened steel rollers 67 equidistantly. The diameter of each of the rollers is greater than the radial gap between the inner and outer rings when the rings are coaxially located. The cage and rollers are assembled between the inner and outer rings such that the rollers lie in the spaces between the inclined surfaces 65 on the inner ring and the bore of the outer ring. The cage and inner ring are extended in one direction beyond the ends of the rollers and are slotted to receive the end of a spring 68. The spring is mounted in such a way as to urge the cage in a direction as will urge the rollers up to the inclines on the outer periphery of the inner ring.

It will be clear that if the inner ring is now rotated in the same direction as the force imposed on the cage by the spring, then no drive will be transmitted to the outer ring. On the other hand, if the inner ring is rotated in a direction opposing that in which the cage is urged by the spring, the frictional forces between the inner ring and the rollers and again between the rollers and the outer ring imposed by the forces of the wedging action will cause transmission of the rotation to the outer ring without lost motion. The Phosphor bronze bearing pads and retainer plates 61 secured to the outer ring 62 retain the other components comprising the assembly. The lower clutch is arranged to transmit drive in the opposite direction from the upper clutch.

Figure 8:
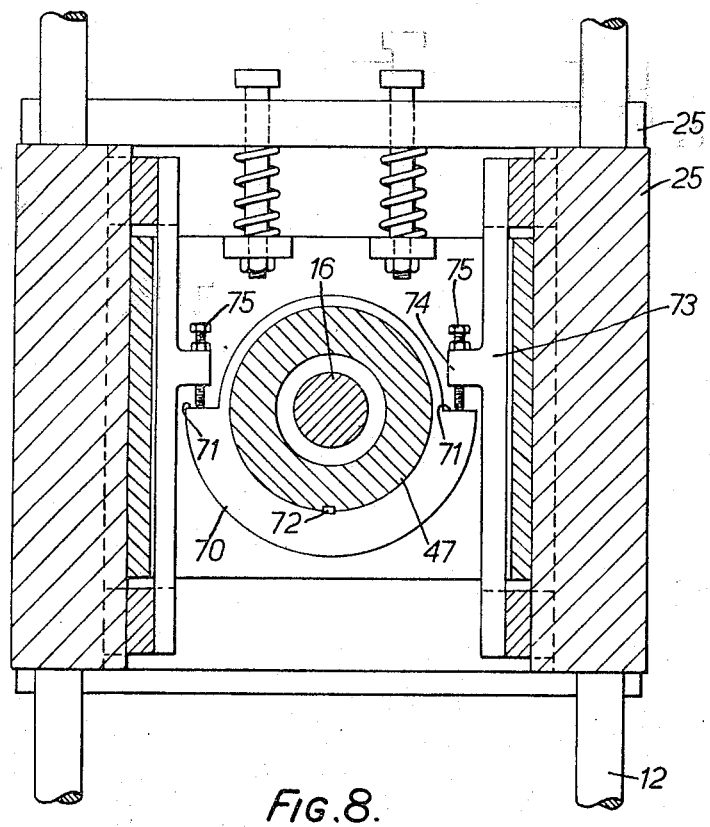
FIGURE 8 is a view corresponding to that of FIGURE 5 showing an alternative embodiment.

FIGURE 8 shows an alternative to the provision of two pinions with their uni-directional clutches and the two racks in this alternative embodiment, a ring 70 having two diametrically opposed flat radial surfaces 71 is keyed, by a key 72, to the rotatable sleeve 47. Two stop bars 73 are rigidly mounted on the main crosshead 25, each bar having a projection 74 which is drilled and tapped to carry an adjusting screw 75 is arranged to abut one of the radial surfaces 71. For the reasons previously stated, the distance between the two screws is the same as or slightly less than the pitch circle diameter of the peel driving sprocket.

On assembly, the adjusting screws are adjusted equally to take up any slack in the peel rotating chain. Any extension of the chain under load is accommodated by the rearward movement of the peel drive unit as a result of the pump casing torque reaction against the relevant adjusting screw.

The advantage of the embodiments described with reference to FIGURES 3 to 7 and 8 is that the running and starting torque are always equal.

I claim:

1. A manipulator comprising a carriage carrying a peel, a support structure mounted on the carriage, a peel end supporting device, in the form of an elongated flexible member, connecting the forward end of the peel and the support structure to support the main weight of the forward end of the peel, a driving chain passing round a sprocket secured to the peel, means for driving the driving chain in either direction to rotate the peel, and means for maintaining tension in the driving chain irrespective of the position of the forward end of the peel.

2. A manipulator comprising a carriage carrying a peel, a support structure mounted on the carriage for forwards and rearwards movement relative to the carriage, a peel end supporting device, in the form of a chain, belt or the like, connecting the forward end of the peel and the support structure to support the main weight of the forward end of the peel, means for moving the support structure forwards and rearwards to lower or lift said forward end, an endless driving chain passing round a sprocket keyed to the peel and a driving sprocket slidably mounted on the carriage, means for driving the driving sprocket in either direction to rotate the peel, and means for maintaining tension in the driving chain irrespective of the position of the forward end of the peel.

3. A manipulator according to claim 2 in which the means for maintaining tension in the driving chain includes means permanently passing the driving sprocket towards the rear of the peel relative to the support structure to which the supporting means is secured, with a force sufficient to ensure that the driving sprocket will move rearwards with the support structure when no torque is applied to the driving sprocket.

4. A manipulator according to claim 2 in which the means for driving the driving sprocket comprises a hydraulic motor.

5. A manipulator according to claim 4 in which the means for maintaining tension in the driving chain includes a hydraulic piston and cylinder assembly effectively connected between the support structure and the driving sprocket and arranged to be supplied with the hydraulic supply for the hydraulic motor, to urge the driving sprocket rearwardly relative to the support structure, the effective piston area being such that the rearward force exerted by the hydraulic piston and cylinder assembly is always greater than the forward force on the driving sprocket due to driving tension in the driving chain.

6. A manipulator according to claim 2 in which the means for driving the sprocket is mounted such that any driving torque applied to the sprocket applies a reverse force to the sprocket mounting so as to urge the sprocket mounting rearwards relative to the support structure with a force at least equal to the forward force on the sprocket mounting produced by driving tension in the driving chain.

7. A manipulator according to claim 6 in which the driving means comprises a motor secured to a sleeve and connected to the sprocket by a shaft, such that the driving torque exerted on the sprocket through the shaft is exerted on the sleeve in the reverse direction, and including a pair of pinions mounted on the outside of the sleeve by uni-directional clutches, each pinion meshing with a rack extending parallel to the axis of the carriage, each of the uni-directional clutches permitting drive transmission in a direction opposed to that of the other, and being so arranged that torque transmitted to the sleeve always urges the sleeve and sprocket rearwards relative to the support structure by virtue of the force exerted between the relevant rack and pinion, irrespective of the direction of rotation of the motor.

8. A manipulator according to claim 7 in which the pitch circle diameter of each pinion is no greater than the pitch circle diameter of the driving sprocket.

9. A manipulator according to claim 6 in which the driving means comprises a motor secured to a sleeve connected to the sprocket by a shaft, such that the driving torque exerted on the sprocket is exerted on the sleeve in reverse direction, and including a ring secured to the outside of the sleeve and having two diametricallly opposed flat radial surfaces, abutting means arranged to abut each surface, such that the sleeve torque reaction acts against the relevant abutting means to urge the driving sprocket rearwards relative to the support structure.

No references cited.

WILLIAM W. DYER, JR., *Primary Examiner.*

H. L. HINSON, *Examiner.*